3,078,273
Patented Feb. 19, 1963

3,078,273
CYCLOHEXENYL DITHIOCARBAMATES
Marion W. Harman, Nitro, and John J. D'Amico, Charleston, W. Va., assignors to Monsanto Chemical Company, St. Louis, Mo., a corporation of Delaware
No Drawing. Filed Aug. 10, 1959, Ser. No. 832,435
13 Claims. (Cl. 260—293.4)

The present invention relates to cyclohexenyl esters of dithiocarbamic acids. More particularly, the present invention relates to cyclohexenyl dithiocarbamates which are herbicides, especially grass-specific herbicides, and to methods for their preparation.

Cyclohexenyl esters of dithiocarbamic acids in which the amino substituent on the thiocarbonyl radical is secondary amino have been found to exert useful herbicidal activity. Cyclohexenyl esters of dithiocarbamic acids in which one of the nitrogen substituents is phenyl or halogen substituted phenyl and the other is halogen substituted alkenyl are disclosed in our co-pending application Serial No. 726,603, filed April 7, 1958 now U.S. 2,997,382, of which this application is a continuation-in-part. Herbicidally effective cyclohexenyl esters have now been found containing a variety of secondary amino substituents.

The new compounds may be represented by the structure

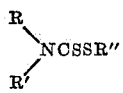

where R" represents cyclohexenyl and R and R' represent alkyl, phenoxyalkyl, benzyloxyalkyl, alkoxyalkyl, haloalkyl, haloalkenyl, cyclohexyl, cyclohexenyl, propargyl, cyanoalkyl, furfuryl, tetrahydrofurfuryl, or radicals which together in combination with the nitrogen, form a heterocyclic ring. One of R and R' may be benzyl. Preferred examples of R and R' comprise methyl, ethyl, butyl, propyl, isopropyl, 3-methoxypropyl, 2-chloroallyl, 2-cyclohexenyl, piperidyl, alkyl substituted piperidyl, such as 5-ethyl-2-methyl-1-piperidyl, 1,2,3,6-tetrahydropyridyl and pyrrolidyl. By alkenyl radicals are meant monoolefinic hydrocarbon radicals, i.e., unsaturated acyclic hydrocarbon radicals in which the unsaturation consists in one double bond. The preferred acyclic radicals contain less than six carbon atoms in the acyclic chain whether saturated or unsaturated although substitution by lower alkoxy, phenoxy and benzyloxy is feasible. While cyclohexyl and cyclohexenyl radicals are suitable, these are desirably coupled with a lower alkyl or lower alkenyl group as the other nitrogen substituent. The presence of a secondary amino substituent attached to the thiocarbonyl radical is important for the desired phytotoxic properties. Whether one or both radicals R and R' are halogen substituted, any of the halogens appear suitable but the middle halogens chlorine and bromine are preferred.

While the preferred ester radical is 2-cyclohexenyl, isomers thereof and middle halogen as well as lower alkyl substituted derivatives of cyclohexenyl radicals are contemplated. Suitable variables are illustrated by the following typical examples:

2-cyclohexenyl dimethyldithiocarbamate,
2-cyclohexenyl diethyldithiocarbamate,
2-cyclohexenyl dipropyldithiocarbamate,
2-cyclohexenyl diisopropyldithiocarbamate,
2-cyclohexenyl dibutyldithiocarbamate,
2-cyclohexenyl diisobutyldithiocarbamate,
2-cyclohexenyl N-n-propyl-N-propargyldithiocarbamate,
2-cyclohexenyl N-isopropyl-N-allyldithiocarbamate,
2-cyclohexenyl N-isopropyl-N-2-chloroallyldithiocarbamate
2-cyclohexenyl N-isopropyl-N-beta-cyanoethyldithiocarbamate,
2-cyclohexenyl N-isopropyl-N-3-chloroallyldithiocarbamate,
2-cyclohexenyl diallyldithiocarbamate,
2-cyclohexenyl di-2-chloroallyldithiocarbamate,
2-cyclohexenyl N-allyl-N-methoxypropyldithiocarbamate,
2-cyclohexenyl N-2-chloroallyl-N-methoxypropyldithiocarbamate,
2-cyclohexenyl 4-morpholinecarbodithioate,
2-cyclohexenyl 1-pyrrolidinecarbodithioate,
2-cyclohexenyl bis(2-methoxyethyl)dithiocarbamate,
2-cyclohexenyl bis(2-methoxypropyl)dithiocarbamate,
2-cyclohexenyl bis(2-chloropropyl)dithiocarbamate,
2-cyclohexenyl 1-piperidinecarbodithioate,
2-cyclohexenyl 2-methyl-1-piperidinecarbodithioate,
2-cyclohexenyl bis(2-phenoxyethyl)dithiocarbamate,
2-cyclohexenyl N-2-phenoxyethyl-N-ethyldithiocarbamate,
2-cyclohexenyl bis(2-benzyloxyethyl)dithiocarbamate,
2-cyclohexenyl N-2-benzyloxyethyl-N-ethyldithiocarbamate,
2-cyclohexenyl N-cyclohexyl-N-ethyldithiocarbamate,
2-cyclohexenyl N-benzyl-N-ethyldithiocarbamate,
2-cyclohexenyl 5-ethyl-3-methyl-1-piperidinecarbodithioate,
2-cyclohexenyl N-methyl-N-cyclohexenyldithiocarbamate,
2-cyclohexenyl N-2-bromoallyl-N-isopropyldithiocarbamate,
2-cyclohexenyl bis(ethoxyethyl)dithiocarbamate,
2-cyclohexenyl N-methyl-N-n-butyldithiocarbamate,
2-cyclohexenyl N-ethyl-N-n-butyldithiocarbamate,
2-cyclohexenyl N-allyl-N-n-butyldithiocarbamate,
2-cyclohexenyl N-methallyl-N-allyldithiocarbamate,
2-cyclohexenyl 1,2,3,6-tetrahydropyridylcarbodithioate,
2-cyclohexenyl N-furfuryl-N-allyldithiocarbamate,
2-cyclohexenyl N-furfuryl-N-isopropyldithiocarbamate,
3-cyclohexenyl diethyldithiocarbamate,
4-bromo-2-cyclohexenyl diethyldithiocarbamate,
2-chloro-2-cyclohexenyl diethyldithiocarbamate,
3-chloro-2-cyclohexenyl diethyldithiocarbamate,
2-bromo-3-cyclohexenyl diethyldithiocarbamate,
2-methyl-2-cyclohexenyl diethyldithiocarbamate,
3-methyl-2-cyclohexenyl diethyldithiocarbamate,
4-methyl-2-cyclohexenyl diethyldithiocarbamate,
5-methyl-2-cyclohexenyl diethyldithiocarbamate,
2-ethyl-2-cyclohexenyl diethyldithiocarbamate,
2-cyclohexenyl N-ethyl-N-decyldithiocarbamate,
2-cyclohexenyl N-ethyl-N-tetrahydrofurfuryldithiocarbamate and
2-cyclohexenyl N-allyl-N-tetrahydrofurfuryldithiocarbamate.

The following examples illustrate the preparation but the invention is not limited thereto.

EXAMPLE 1

To a stirred solution of 25.3 grams (0.25 mole) of diisopropylamine and 40 grams (0.25 mole) of 25% sodium hydroxide in 250 ml. of water was added dropwise at 20–25° C. 19 grams (0.25 mole) of carbon bisulfide. After the addition was complete, which required about 15 minutes, the product was stirred for an hour and then 40.3 grams (0.25 mole) of 3-bromocyclohexene (J. Am. Chem. Soc. 73, 4495 (1951)) added in one portion. An exothermic reaction resulted in a temperature rise from 31 to 43° C. in 10 minutes. The mixture was then stirred for 24 hours, cooled to 0° C., the precipitate filtered, washed with water until neutral to litmus and air dried on a porous plate. The 2-cyclohexenyl diisopropyldithiocarbamate thus obtained was a cream colored solid melting at 55–57° C. after recrystallization from ethyl alcohol. Analysis gave 5.88% nitrogen and 24.96% sulfur as compared to 5.44% nitrogen and 24.91% sulfur calculated for $C_{13}H_{23}NS_2$.

EXAMPLE 2

To a stirred solution of 40.9 grams (0.25 mole) of 2-chloro-N-(3-methoxypropyl)allylamine (U.S. Patent 2,854,467) and 40 grams (0.25 mole) of 25% sodium hydroxide in 200 ml. of water was added dropwise in 15 minutes at 25–30° C. 19 grams (0.25 mole) of carbon bisulfide. After stirring for an hour, 40.3 grams (0.25 mole) of 3-bromocyclohexene was added in one portion, causing the temperature to rise from 30 to 45° C. The reaction mixture was stirred at room temperature for 6 hours and then extracted with 300 ml. of ethyl ether. The ether solution was washed with water until neutral to litmus, dried over sodium sulfate and the ether removed in vacuo at a maximum temperature of 80–90° C/1–2 mm. The 2-cyclohexenyl N-(2-chloroallyl)-3-methoxypropyldithiocarbamate was obtained as an amber oil in 73.9% yield. Analysis gave 4.56% nitrogen and 11.53% chlorine as compared to 4.38% nitrogen and 11.08% chlorine calculated for $C_{14}H_{22}ClNOS_2$.

EXAMPLE 3

In the procedure of Example 2, 45 grams (0.25 mole) of 25% dimethylamine was substituted for the amine of that example. The 2-cyclohexenyl dimethyldithiocarbamate was an amber liquid obtained in 53.9% yield. Analysis gave 6.53% nitrogen as compared to 6.96% calculated for $C_9H_{15}NS_2$.

EXAMPLE 4

In this example, 18.3 grams (0.25 mole) of diethylamine was substituted for the amine of Example 2. The 2-cyclohexenyl diethyldithiocarbamate was obtained in 50.6% yield as an amber liquid. Analysis gave 6.08% nitrogen and 27.12% sulfur as compared to 6.11% nitrogen and 27.96% sulfur calculated for $C_{11}H_{19}NS_2$

EXAMPLE 5

N-isopropyl-2-cyclohexenylamine required as a starting material was obtained by heating a mixture of 295.6 grams (5.0 moles) of isopropylamine and 100 ml. of water to 45° C. and adding dropwise in one hour 332.1 grams (2.0 moles) of 3-bromocyclohexene. The exothermic reaction caused a temperature rise from 45 to 70° C. during the addition. The stirred reaction mixture was heated at 80–85° C. for 24 hours. After cooling to 25° C., 400 grams of 25% sodium hydroxide and 200 grams of solid sodium hydroxide were added. Stirring was continued for an additional hour and the mixture filtered. The top layer separating from the filtrate was dried over solid sodium hydroxide and the product distilled. The fraction distilling at 170–172° C. at atmospheric pressure was collected.

The sodium salt of a dithiocarbamate was produced by mixing together 14.0 grams (0.1 mole) of N-isopropyl-2-cyclohexenylamine, 16 grams (0.1 mole) of 25% sodium hydroxide and 100 ml. of water and at 20–25° C. adding dropwise 7.6 grams (0.1 mole) of carbon bisulfide. After stirring for an hour, 16.1 grams (0.1 mole) of 3-bromocyclohexene was added in one portion. The reaction mixture was stirred at 25–30° C. for 24 hours and then extracted with 300 ml. of ether. The ether solution was washed with water until neutral to litmus, dried over sodium sulfate and the ether removed in vacuo at a maximum temperature of 80–90° C./1–2 mm. The 2-cyclohexenyl N-(2-cyclohexenyl)isopropyldithiocarbamate was obtained in 97% yield as a viscous amber oil. Analysis gave 4.74% nitrogen as compared to 4.7% calculated for $C_{16}H_{25}NS_2$.

EXAMPLE 6

In the procedure of Example 5, 12.7 grams (0.1 mole) of 5-ethyl-2-methylpiperidine was employed as the amine. The 2-cyclohexenyl 5-ethyl-2-methylpiperidinecarbodithi-oate was obtained in 74.2% yield as a viscous amber liquid analyzing 4.82% nitrogen as compared to 4.94% calculated for $C_{15}H_{25}NS_2$.

EXAMPLE 7

In this example, 8.5 grams (0.1 mole) of piperidine was employed as the amine in the procedure of Example 5. The 2-cyclohexenyl 1-piperidinecarbodithioate was a viscous amber liquid obtained in 78.7% yield. Analysis gave 5.25% nitrogen as compared to 5.80% calculated for $C_{12}H_{19}NS_2$.

EXAMPLE 8

Substituting 7.2 grams (0.1 mole) of pyrrolidine for the N-isopropyl-2-cyclohexenylamine of Example 5, the reaction mixture was stirred at 50–60° C. for 6 hours and then isolated as in that example. The 2-cyclohexenyl 1-pyrrolidinecarbodithiate was obtained as a viscous amber liquid in 83.9% yield. Analysis gave 5.41% nitrogen as compared to 6.16% calculated for $C_{11}H_{17}NS_2$.

EXAMPLE 9

To a stirred solution containing 20.8 grams (0.25 mole) of 1,2,3,6-tetrahydropyridine, 40.0 grams (0.25 mole) of 25% sodium hydroxide and 300 ml. of water was added dropwise at 5–15° C. 19.0 grams (0.25 mole) of carbon bisulfide and the mixture stirred at 25–30° C. for an hour. Then 40.25 grams (0.25 mole) of 3-bromocyclohexene was added in one portion and the stirred reaction mixture heated at 50–60° C. for 4 hours. After cooling to 25° C., the product was extracted with 400 ml. of ethyl ether. The ether solution was washed with water until netural to litmus, dried over sodium sulfate and the ether removed in vacuo at a maximum temperature of 80–90° C./1–2 mm. The 2-cyclohexenyl 1,2,3,6-tetrahydropyridinecarbodithioate was obtained in 72% yield as an amber oil. Analysis gave 5.55% nitrogen as compared to 5.85% calculated for $C_{12}H_{17}NS_2$

EXAMPLE 10

Substituting 12.8 grams (0.1 mole) of N-ethylcyclohexylamine for the amine of Example 5, the reaction mixture was stirred at 50–60° C. for 4 hours and then isolated as in that example. The 2-cyclohexenyl N-cyclohexyl-N-ethyldithiocarbamate was obtained as a viscous amber oil in 77.5% yield. Analysis gave 4.91% nitrogen as compared to 4.94% calculated for $C_{15}H_{25}NS_2$.

The compounds of this invention are particularly valuable as pre-emergent grass-specific herbicides. The toxicants may be applied to the soil conveniently in the form of a spray containing the active ingredient in a concentration within the range of 1 to 60 pounds per acre. The active components are insoluble in water but soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided or granular solid carrier, as for example talc, clay, pyrophyllite, silica and fuller's earth. Alternatively, the dry composition may be dispersed in water and applied as a spray. Examples of grasses which are controlled comprise foxtail, giant foxtail, cheat grass, wild oats, rye grass, annual blue grass and crab grass. Weeds from the following plant families are controlled to varying degrees: Leguminaseae, Cucurbitaceae, Umbellifereae, Chenopodiaceae, Amaranthaceae, Convolvulaceae and Aizoaceae.

The following table illustrates the pre-emergent herbicidal activity of the new compounds. The ester was emulsified in water and the emulsion applied as a spray. In this manner, the active ingredient at a dosage of 25 pounds per acre was applied to the ground of seeded plots before the grass or other plants emerged.

*Table I*

| Toxicant | Results observed |
|---|---|
| 2-Cyclohexenyl diisopropyldithiocarbamate. | Severe phytotoxicity to rye grass and foxtail. |
| 2-Cyclohexenyl N-(2-chloro-allyl)-3-methoxypropyldithiocarbamate. | Severe phytotoxicity to barnyard grass and crab grass. |
| 2-Cyclohexenyl dimethyldithiocarbamate. | Severe phytotoxicity to wild oats, brome-cheat grass, rye grass, foxtail, barnyard grass, crab grass and pigweed; moderate phytotoxicity to sugar beet and corn. |
| 2-Cyclohexenyl diethyldithiocarbamate. | Severe phytotoxicity to morning glory, wild oats, brome-cheat grass, rye grass, buckwheat, sugar beet, corn, foxtail, barnyard grass, crab grass and pigweed; moderate phytotoxicity to radish-mustard. |
| 2-Cyclohexenyl N-(2-cyclohexenyl)isopropyldithiocarbamate. | Severe phytotoxicity to morning glory, crab grass and pigweed; moderate phytotoxity to buckwheat, radish-mustard, sugar beet, cotton, barnyard grass and field bindweed. |
| 2-Cyclohexenyl 5-ethyl-2-methyl-1-piperidinecarbodithioate. | Severe phytotoxicity to foxtail, barnyard grass, crab grass and pigweed. |
| 2-Cyclohexenyl 1-piperidinecarbodithioate. | Severe phytotoxicity to wild oats, rye grass, foxtail, barnyard grass, crab grass and pigweed; moderate phytotoxicity to buckwheat and sugar beet. |
| 2-Cyclohexenyl 1-pyrrolidinecarbodithioate. | Severe phytotoxicity to wild oats, rye grass, buckwheat, sugar beet, foxtail, barnyard grass, crab grass and pigweed. |
| 2-Cyclohexenyl 1,2,3,6-tetrahydropyridinecarbodithioate. | Severe phytotoxicity to wild oats, rye grass, barnyard grass, crab grass, pigweed and sorghum; moderate phytotoxity to sugar beet. |

The foregoing results are illustrative although the amounts required for effective control will vary. When tested at lower concentrations, 2-cyclohexenyl 5-ethyl-2-methyl-1-piperidine-carbodithioate and 2-cyclohexenyl 1-piperidinecarbodithioate completely controlled grasses at 5 pounds per acre.

Some of the compounds are toxic to soil fungi as well as to germinating seedlings. The compounds also comprise insect toxicants. Additionally the cyclohexenyl dithiocarbamates accelerate the vulcanization of rubber. While cyclohexyl di(chloroalkyl)dithiocarbamates, as for example 2-cyclohexenyl di(chlorobutyl)dithiocarbamate, are useful herbicides, the halogen and nitrogen should be separated by at least four carbon atoms to permit a dithiocarbamate to form from a halogen substituted dialkyl amine and carbon bisulfide.

It is intended to cover all changes and modifications of the examples of the invention herein chosen for purposes of disclosure which do not constitute departures from the spirit and scope of the invention.

What is claimed is:
1. A compound of the structure

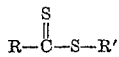

where R represents a secondary amino radical selected from the group consisting of di(lower alkyl)amino, di(lower alkenyl)amino, di(halogen lower alkyl)amino, di(halogen lower alkenyl)amino, N-lower alkyl N-propargylamino, N-alkyl-N-lower alkylamino, N-lower alkyl-N-tetrahydrofurfurylamino, N-lower alkenyl-N-tetrahydrofurfurylamino, N-lower alkyl N-lower alkenylamino, N-lower alkyl N-halogen lower alkenylamino, N-lower alkyl N-beta-cyanoethylamino, N-lower alkenyl N-lower alkoxy lower alkylamino, N-halogen lower alkenyl N-lower alkoxy lower alkylamino, di(lower alkoxy lower alkyl)amino, di(phenoxy lower alkyl)amino, di(benzyloxy lower alkyl)amino, N(phenoxy lower alkyl) N-lower alkylamino, N-cyclohexyl N-lower alkylamino, N-(benzyloxy lower alkyl) N-lower alkylamino, N-cyclohexenyl N-lower alkylamino, N-furfuryl N-lower alkenylamino, N-benzyl N-lower alkylamino, N-furfuryl N-lower alkylamino, morpholinyl, pyrrolidinyl, piperidinyl, lower alkyl piperidinyl and 1,2,3,6-tetrahydropyridyl and R' represents an alicyclic unsaturated radical selected from the group consisting of 2-cyclohexenyl, 3-cyclohexenyl, lower alkyl 2-cyclohexenyl, halogen 2-cyclohexenyl and halogen 3-cyclohexenyl wherein the aforesaid halogen is selected from the group consisting of chlorine and bromine.

2. A compound of the structure

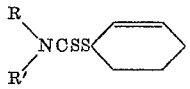

where R and R' are lower alkyl radicals.

3. A compound of the structure

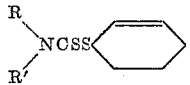

where R and R' are lower alkenyl radicals.

4. A compound of the structure

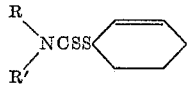

where R represents lower alkyl and R' represents lower alkenyl.

5. 2-cyclohexenyl diethyldithiocarbamate.
6. 2-cyclohexenyl dimethyldithiocarbamate.
7. 2-cyclohexenyl 1-piperidinecarbodithioate.
8. 2-cyclohexenyl 5-ethyl-2-methyl-1-piperidinecarbodithioate.
9. 2-cyclohexenyl 1-pyrrolidinecarbodithioate.
10. 2 - cyclohexenyl N - (2-cyclohexenyl)isopropyldithiocarbamate.
11. 2-cyclohexenyl N-(2-chloroallyl)3-methoxypropyldithiocarbamate.
12. 2-cyclohexenyl diisopropyldithiocarbamate.
13. 2 - cyclohexenyl-1,2,3,6-tetrahydropyridinecarbodithioate.

References Cited in the file of this patent

UNITED STATES PATENTS

| 2,060,733 | Hunt et al. | Nov. 10, 1936 |
| 2,579,384 | Handy et al. | Dec. 18, 1951 |
| 2,829,038 | Ochsner | Apr. 1, 1958 |
| 2,875,031 | Kruckenburg et al. | Feb. 24, 1959 |
| 2,891,065 | Gundel | June 16, 1959 |
| 2,895,980 | Harman et al. | July 21, 1959 |
| 2,919,182 | Harman et al. | Dec. 29, 1959 |
| 2,941,880 | D'Amico | June 21, 1960 |

FOREIGN PATENTS

| 805,500 | Great Britain | Dec. 10, 1958 |
| 617,318 | Germany | Aug. 17, 1935 |
| 858,352 | Germany | Dec. 4, 1952 |